US012738586B2

(12) United States Patent
Zhuang et al.

(10) Patent No.: US 12,738,586 B2
(45) Date of Patent: Sep. 15, 2026

(54) BATTERY MODULE END PLATE, BATTERY MODULE, AND PREPARATION METHOD FOR BATTERY MODULE END PLATE

(71) Applicant: CONTEMPORARY AMPEREX TECHNOLOGY (HONG KONG) LIMITED, Hong Kong (CN)

(72) Inventors: Tao Zhuang, Ningde (CN); Xuan Liu, Ningde (CN); Yangyang Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 74 days.

(21) Appl. No.: 18/600,783

(22) Filed: Mar. 11, 2024

(65) Prior Publication Data

US 2024/0213612 A1 Jun. 27, 2024

Related U.S. Application Data

(63) Continuation of application No. PCT/CN2022/125642, filed on Oct. 17, 2022.

(30) Foreign Application Priority Data

Oct. 18, 2021 (CN) ......................... 202111209371.7

(51) Int. Cl.

*H01M 50/28* (2021.01)
*B29C 45/14* (2006.01)
*B29L 31/34* (2006.01)

(52) U.S. Cl.

CPC ......... *H01M 50/28* (2021.01); *B29C 45/1418* (2013.01); *B29C 2045/14245* (2013.01); *B29L 2031/3468* (2013.01)

(58) Field of Classification Search

CPC .. H01M 50/28; H01M 50/227; H01M 50/242; H01M 2220/20; B29C 45/14;

(Continued)

(56) References Cited

FOREIGN PATENT DOCUMENTS

CN 204271149 U * 4/2015
CN 106827374 A * 6/2017 ......... B29C 45/1418

(Continued)

OTHER PUBLICATIONS

Wu Wenqing; CN112496306A; Preparation method of battery end plate with insert; EPO English Machine Translation; pp. 1-5 (Year: 2021).*

(Continued)

*Primary Examiner* — Bayan Salone
(74) *Attorney, Agent, or Firm* — K&L Gates LLP

(57) ABSTRACT

Provided are a battery module end plate, a battery module, and a preparation method for a battery module end plate. The preparation method includes: providing a first blank and stamping the first blank to obtain a first plate body; providing a molding die and placing the first plate body into the molding die; providing a second blank and melting the second blank to obtain a molten material; and injecting the molten material into the molding die to allow the molten material to be wrapped around the first plate body, and obtaining the battery module end plate through cooling. The battery module end plate includes the first plate body and a second plate body formed by cooling the molten material and wrapped around the first plate body.

12 Claims, 4 Drawing Sheets

(58) Field of Classification Search
CPC ........... B29C 45/1418; B29C 45/14245; B29L 2031/3468; B22D 19/00; Y02E 60/10
See application file for complete search history.

(56) References Cited

FOREIGN PATENT DOCUMENTS

| | | | | | |
|---|---|---|---|---|---|
| CN | 206250253 U | * | 6/2017 | .......... | H01M 50/242 |
| CN | 207441797 U | * | 6/2018 | | |
| CN | 208923254 U | * | 5/2019 | | |
| CN | 109994666 A | * | 7/2019 | ............ | H01M 50/50 |
| CN | 109994696 A | * | 7/2019 | ............ | H01M 50/50 |
| CN | 110238517 A | * | 9/2019 | ............. | C22C 21/02 |
| CN | 211629155 U | * | 10/2020 | | |
| CN | 112496306 A | * | 3/2021 | ............. | B22D 17/00 |
| CN | 212874637 U | * | 4/2021 | | |
| CN | 213278221 U | * | 5/2021 | | |
| TW | 201108909 A | * | 3/2011 | | |

OTHER PUBLICATIONS

Zhang Yu; TW201108909A; Housing of portable electric device and method for making same; EPO English Machine Translation; pp. 1-6 (Year: 2011).*
The First Office Action received in the counterpart Chinese Application 202111209371.7, mailed on May 18, 2024.
International Search Report received in the corresponding international application PCT/CN2022/125642, mailed Jan. 9, 2023, 6 pages.
Extended European Search Report issued to related EP Application No. 22882797.8, dated Feb. 19, 2025, 7 pages.

* cited by examiner

BATTERY MODULE END PLATE, BATTERY MODULE, AND PREPARATION METHOD FOR BATTERY MODULE END PLATE

CROSS REFERENCE TO RELATED APPLICATION

This application is a continuation of International Application PCT/CN2022/125642, filed on Oct. 17, 2022, which claims a priority to Chinese Patent Application No. 202111209371.7, titled "BATTERY MODULE END PLATE, BATTERY MODULE, AND PREPARATION METHOD FOR BATTERY MODULE END PLATE," and filed with China National Intellectual Property Administration on Oct. 18, 2021, the entire contents of which are incorporated herein by reference.

FIELD

The present disclosure relates to the field of battery technologies, and more particularly, to a battery module end plate, a battery module, and a preparation method for the battery module end plate.

BACKGROUND

A new energy vehicle generally employs a battery pack as an energy component, and a battery module is a core component of the battery pack. The battery module typically consists of a base plate, a top cover, two side plates, two end plates, and a plurality of battery cells. The base plate, the top cover, the two side plates, and the two end plates are assembled to combine the plurality of battery cells together.

Traditional end plates have weak deformation resistance. During the use of the battery module, the battery cells are heated and exert expansion forces on the end plates, which easily leads to deformation of the end plates and deteriorates an overall structural stability of the battery module, thereby influencing a normal use of the battery module.

SUMMARY

In view of the above problems, the present disclosure provides a battery module end plate, a battery module, and a preparation method for the battery module end plate.

The preparation method for the battery module end plate includes: providing a first blank and stamping the first blank to obtain a first plate body; providing a molding die and placing the first plate body into the molding die; providing a second blank and melting the second blank to obtain a molten material; and injecting the molten material into the molding die to allow the molten material to be wrapped around the first plate body, and obtaining the battery module end plate through cooling. The battery module end plate includes the first plate body and a second plate body. The second plate body is formed by cooling the molten material and is wrapped around the first plate body. In the battery module end plate obtained by the above preparation method, the second plate body is wrapped around the first plate body, enabling the first plate body and the second plate body to be formed integrally. Therefore, an overall structural stability of the battery module end plate can be effectively ensured, which is conducive to improving an overall anti-deformation ability of the battery module end plate and to reducing a deformation amount of the battery module end plate under a high expansion force. Therefore, it is possible to ensure the overall structural stability of the battery module, which in turn effectively ensures that the battery module can be used normally.

In one embodiment, the first blank is made of metal; and/or the second blank is made of metal or plastic.

In one embodiment, when both the first blank and the second blank are made of metal, the battery module end plate is molded through die-casting molding after the molten material is injected into the molding die.

In one embodiment, when the first blank is made of metal and the second blank is made of plastic, the battery module end plate is molded through injection molding after the molten material is injected into the molding die.

In one embodiment, each of two ends of the first plate body has a connection surface. The connection surface is exposed from the second plate body. Since the first plate body is embedded in the second plate body and the first plate body is made of metal, stiffness of the connection surfaces can be effectively ensured. Therefore, the connection surfaces of the first plate body are welded to the side plates, which effectively ensures stability of a connection between the end plate and the side plate of the battery module.

In one embodiment, the first plate body further has a locking surface exposed from the second plate body. Since the first plate body is embedded in the second plate body and the first plate body is metal, stiffness of the locking surface can be effectively ensured.

In one embodiment, the first plate body has at least one opening. The at least one opening is filled with a part of the molten material during an injection of the molten material into the molding die. By forming the at least one opening at the first plate body, the second plate body is partially located in the at least one opening, which can effectively increases a bonding force between the first plate body and the second plate body.

In one embodiment, the at least one opening includes a plurality of openings. The plurality of openings includes some transverse elongated holes, some longitudinal elongated holes, and some circular holes. By forming the plurality of openings of different shapes, the bonding force between the first plate body and the second plate body can be further increased.

A battery module end plate is prepared by the preparation method as described above.

A battery module includes the battery module end plate as described above.

BRIEF DESCRIPTION OF THE DRAWINGS

In order to clearly explain technical solutions in the embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without creative effort.

Figure 1:
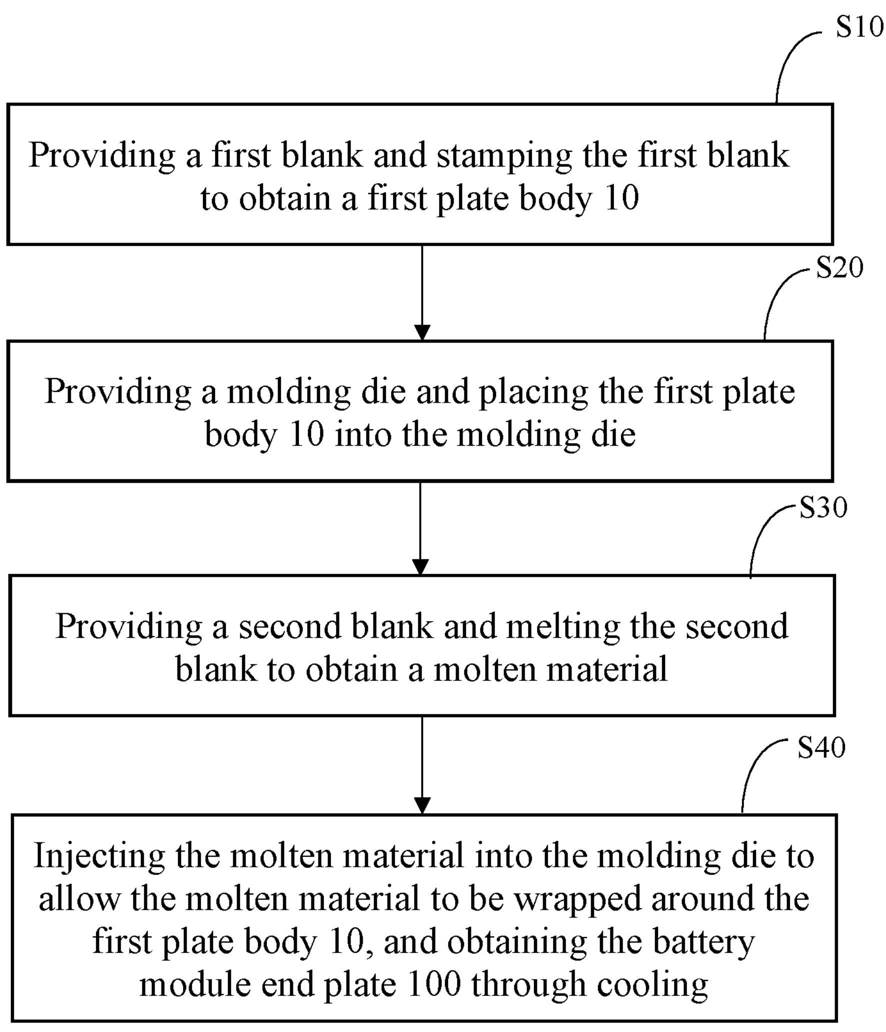
FIG. 1 is a flowchart of a preparation method for a battery module end plate according to an embodiment of the present disclosure.

Reference numerals in the drawings have following meanings:

first plate body 10; first body portion 11; connection surface 110; locking surface 111; avoidance hole 112; first profiled portion 12; first fixing portion 13; opening 14; second plate body 20; second body portion 21; first accommodation space 210; second profiled portion 22; second accommodation space 220; second fixing portion 23; third accommodation space 230; locking hole 231; weight reduction hole 24; battery module end plate 100.

DETAILED DESCRIPTION OF THE EMBODIMENTS

In order to facilitate understanding of the present disclosure and to make the above-mentioned objects, features, and advantages of the present disclosure more obvious and comprehensive, a detailed description of specific embodiments of the present disclosure will be given below in conjunction with the accompanying drawings. In the following description, many specific details are provided to facilitate full understanding of the present disclosure. Preferred embodiments of the present disclosure are illustrated by the accompanying drawings. However, the present disclosure can be implemented in many different forms and is not limited to the embodiments described herein. On the contrary, these embodiments are provided to facilitate thorough and comprehensive understanding of the content of the present disclosure. The present disclosure can be implemented in many other ways than those described herein, and similar improvements can be made by those skilled in the art without contradicting the intent of the present disclosure. Therefore, the present disclosure is not limited by specific embodiments disclosed below.

In the description of the embodiments of the present disclosure, it should be understood that the orientation or the position indicated by terms such as "center", "longitudinal," "lateral," "length," "width," "thickness," "over," "below," "front," "rear," "left," "right," "vertical," "horizontal," "top," "bottom," "inner," "outer," "clockwise," "anti-clockwise," "axial," "radial," and "circumferential" should be construed to refer to the orientation and the position as shown in the drawings, and is only for the convenience of describing the embodiments of the present disclosure and simplifying the description, rather than indicating or implying that the pointed device or element must have a specific orientation, or be constructed and operated in a specific orientation, and therefore cannot be understood as a limitation of the present disclosure.

In addition, terms such as "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the embodiments of the present disclosure, "plurality" means at least two, unless otherwise specifically defined.

In the description of the embodiments of the present disclosure, unless otherwise clearly specified and limited, terms such as "install," "connect," "connect to," "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those of ordinary skill in the art, the specific meaning of the above-mentioned terms in the embodiments of the present disclosure can be understood according to specific circumstances.

In the description of the embodiments of the present disclosure, unless otherwise expressly specified and defined, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

It should be noted that when an element is "fixed to" or "disposed on" another element, it may be directly on the other element or there may be a centered element. When an element is said to be "attached" to another element, it may be directly attached to the other element or there may be both centered elements. As used herein, the terms "vertical", "horizontal," "top," "bottom," "left," "right," and similar expressions are used herein for illustrative purposes only and are not intended to be the only means of implementation.

A new energy vehicle generally employs a battery pack as an energy component, and a battery module is a core component of the battery pack. The battery module typically consists of a base plate, a top cover, two side plates, two end plates, and a plurality of battery cells. The base plate, the top cover, the two side plates, and the two end plates are assembled to combine the plurality of battery cells together.

It has been found that the end plate in the battery module is generally formed by assembling a plurality of metal plates. In an example, a single metal plate is stamped first, and then the plurality of metal plates are fixed together through welding. This would result in a large overall dimensional error and poor structural stability and anti-deformation capability of the end plate. As a result, the end plate cannot resist an expansion force with a high cycle number.

In order to improve the anti-deformation capability of the end plate in the battery module, a connection stability between the plate bodies is effectively strengthened by integrally molding the plate bodies of the end plate through molding die. In this way, the anti-deformation capability can be improved. Meanwhile, accuracy of an overall dimension of the end plate can be ensured.

FIG. 1 is a flowchart of a preparation method for a battery module end plate according to an embodiment of the present disclosure. Referring to FIG. 1, the preparation method includes operations at blocks S10 to S40.

At block S10, a first blank is provided and stamped to obtain a first plate body 10.

In an exemplary embodiment of the present disclosure, a stamping machine is used to stamp the first blank into the first plate body 10 of a predetermined shape. The first blank is made of metal such as aluminum or steel.

At block S20, a molding die is provided, and the first plate body 10 is placed into the molding die.

In an exemplary embodiment of the present disclosure, the molding die has a mold cavity for molding the battery module end plate 100, and the first plate body 10 is placed at a predetermined position in the mold cavity of the molding die.

At block S30, a second blank is provided and melted to obtain a molten material.

In an exemplary embodiment of the present disclosure, the second blank may be made of metal or plastic, and the metal may be aluminum.

Figure 2:
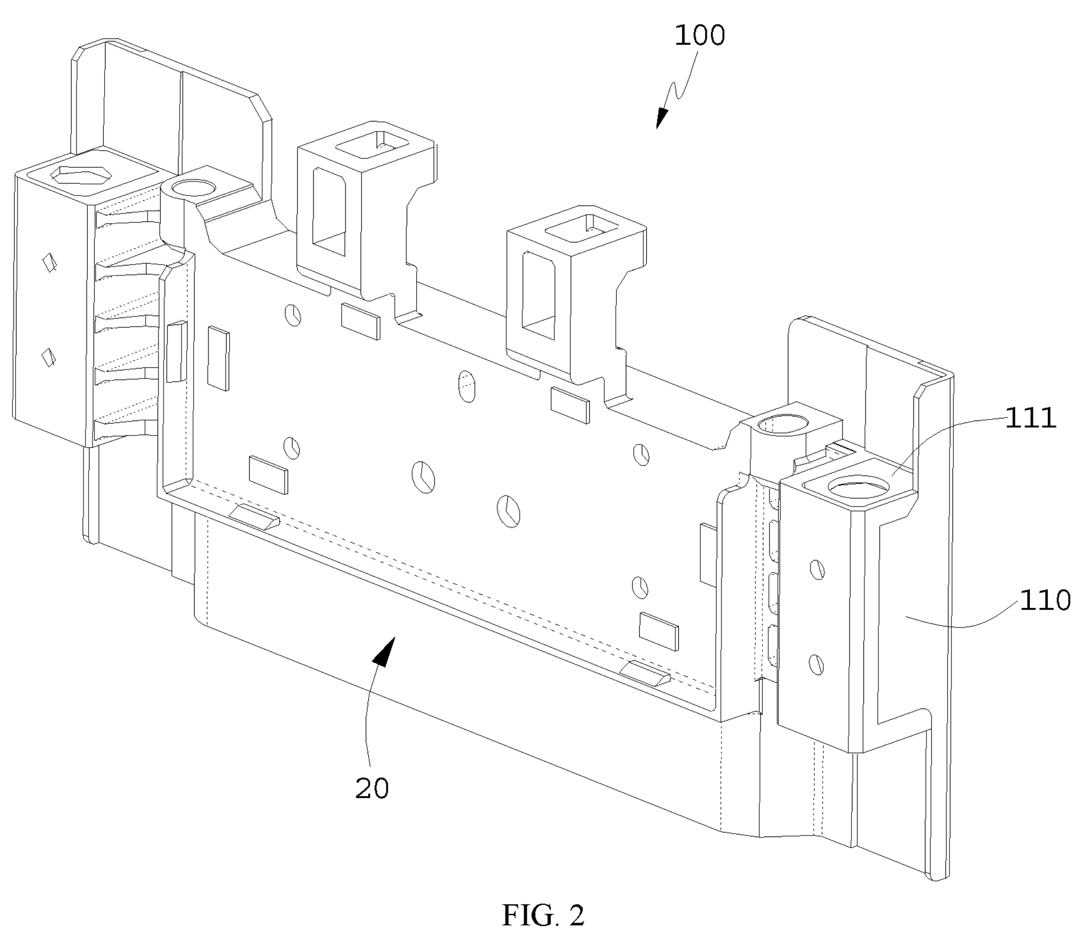
FIG. 2 is a schematic structural view of a battery module end plate according to an embodiment of the present disclosure.
Figure 3:
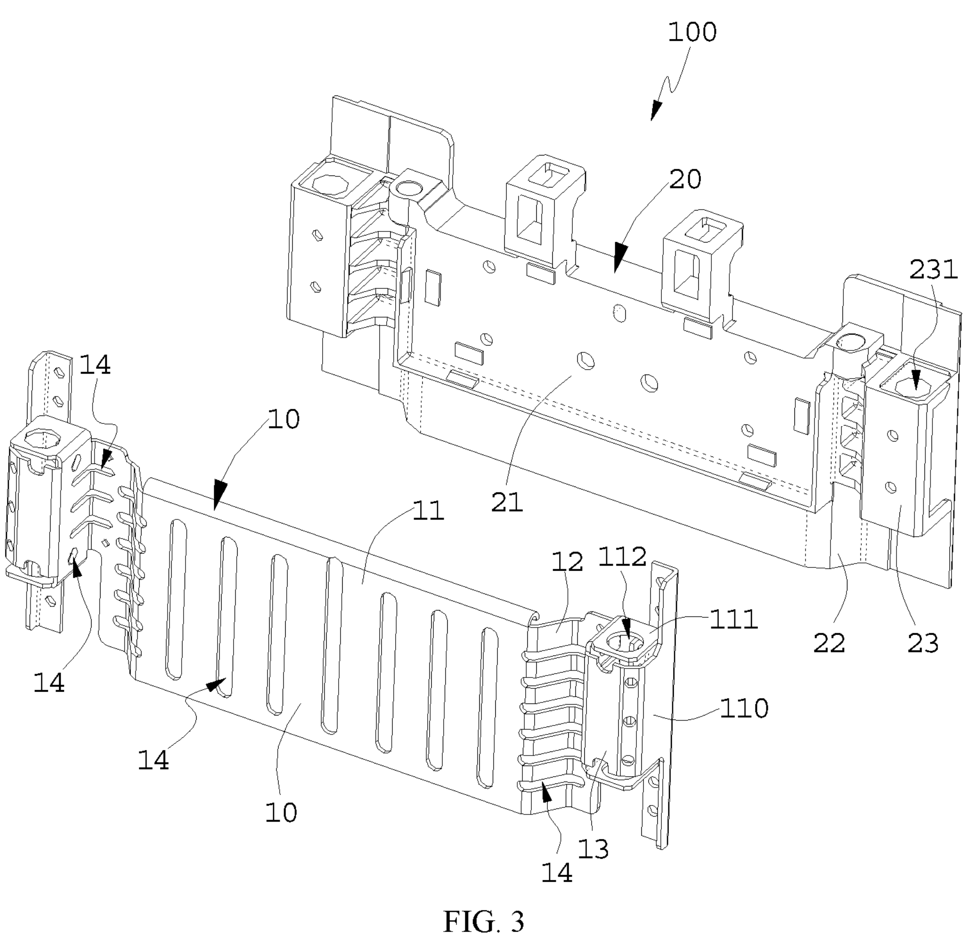
FIG. 3 is an exploded view of the battery module end plate shown in FIG. 2.

At block S40, the molten material is injected into the molding die to allow the molten material to be wrapped around the first plate body 10, and the battery module end plate 100 is obtained through cooling. FIG. 2 is a schematic structural view of a battery module end plate according to an embodiment of the present disclosure. FIG. 3 is an exploded view of the battery module end plate shown in FIG. 2. Referring to FIG. 2 and FIG. 3, the battery module end plate 100 includes the first plate body 10 and a second plate body 20. The second plate body 20 is formed by cooling the molten material and is wrapped around the first plate body 10.

In an exemplary embodiment of the present disclosure, when both the first blank and the second blank are made of metal, for example, the first blank is made of aluminum and the second blank is made of steel, the battery module end plate 100 is molded through die-casting molding after the molten material is injected into the molding die. When the first blank is made of metal such as aluminum, and the second blank is made of plastic, the battery module end plate 100 is molded through injection molding after the molten material is injected into the molding die.

In the battery module end plate 100 prepared by the preparation method for the battery module end plate as described above, the second plate body 20 is wrapped around the first plate body 10. As a result, the first plate body 10 and the second plate body 20 are formed integrally. Therefore, an overall structural stability of the battery module end plate can be effectively ensured, which is conducive to improving an overall anti-deformation ability of the battery module end plate and to reducing a deformation amount of the battery module end plate under a high expansion force. Therefore, it is possible to ensure the overall structural stability of the battery module, which in turn effectively ensures that the battery module can be used normally. In addition, in the preparation method, the first plate body 10 is first stamped and molded, and then the first plate body 10 is placed into the molding die. Then, the melted second blank is injected into the molding die and the battery module end plate 100 is obtained through cooling. Therefore, the process is simple, the production efficiency is high, and the cost is low. Moreover, the battery module end plate 100 is molded through the molding die, which can effectively ensure the accuracy of the battery module end plate 100 and provide high consistency for the battery module end plate 100.

Referring to FIG. 2, in some embodiments, each of two ends of the first plate body 10 has a connection surface 110, and the connection surface 110 is an end face of the first plate body 10. The connection surface 110 is a smooth surface. The connection surfaces 110 are exposed from the second plate body 20. In this way, the connection surfaces 110 can be welded to the side plate when the battery module end plate 100 is assembled with the side plate. Since the first plate body 10 is embedded in the second plate body 20 and the first plate body 10 is metal, the stiffness of the connection surface 110 can be effectively ensured. In this way, as the connection surfaces 110 of the first plate body 10 are welded to the side plate, the connection stability between the battery module end plate 100 and the side plate can be effectively ensured, which in turn ensures the overall stiffness of the battery module.

In some embodiments, the first plate body 10 further has a locking surface 111, and the locking surface 111 is adjacent to the connection surface 110. The locking surface 111 is exposed from the second plate body 20, and is configured to be connected to an external component. Since the first plate body 10 is embedded in the second plate body 20 and the first plate body 10 is made of metal, stiffness of the locking surface 111 can be effectively ensured.

Referring from FIG. 2 to FIG. 5, in an exemplary embodiment, the first plate body 10 includes a first body portion 11, two first profiled portions 12, and two first fixing portions 13. The first body portion 11 is in a flat plate shape, and each of the two first profiled portions 12 is of an L shape. The two first profiled portions 12 are respectively arranged at two ends of the first body portion 11, and the two first fixing portions 13 are respectively arranged at ends of the two first profiled portions 12 away from the first body portion 11. Each of the first fixing portion 13 is a hollow. A side of each of the first fixing portions 13 facing away from the respective first profiled portion 12 is the connection surface 110, and each of a top surface and a bottom surface of the first fixing portion 13 is the locking surface 111.

In some embodiments, the first plate body 10 has at least one opening 14. The at least one opening 14 is filled with a part of the molten material during an injection of the molten material into the molding die. That is, the second plate body 20 is partially located in the at least one opening 14. By forming the at least one opening 14 on the first plate body 10, the second plate body 20 is allowed to be partially located in the at least one opening 14, thereby effectively increasing the bonding force between the first plate body 10 and the second plate body 20, which in turn ensures anti-deformation strength of the battery module end plate 100 in a cycle process of high expansion force. Further, the at least one opening 14 includes a plurality of openings 14. The plurality of openings 14 includes some transverse elongated holes, some longitudinal elongated holes, and some circular holes. By providing the plurality of openings 14 of different shapes, it is beneficial to further increase the bonding force between the first plate body 10 and the second plate body 20. In an example, the plurality of openings 14 at the first body portion 11 is longitudinal elongated holes, and are arranged at intervals in parallel in a transverse direction of the first plate body 10. The plurality of openings 14 at the first profiled portions 22 is transversely elongated holes, and are arranged at parallel intervals in a longitudinal direction of the first plate body 10. Some of the plurality of openings 14 at the first fixing portion 13 are transverse elongated holes, and some of the plurality of openings 14 at the first fixing portions 13 are circular holes.

Figure 4:
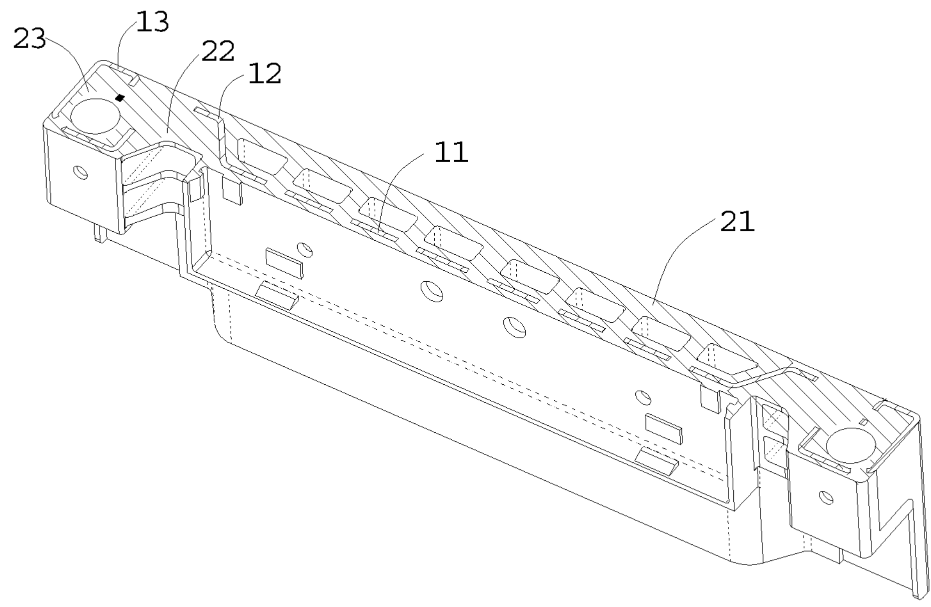
FIG. 4 is a sectional view of the battery module end plate shown in FIG. 2.
Figure 5:
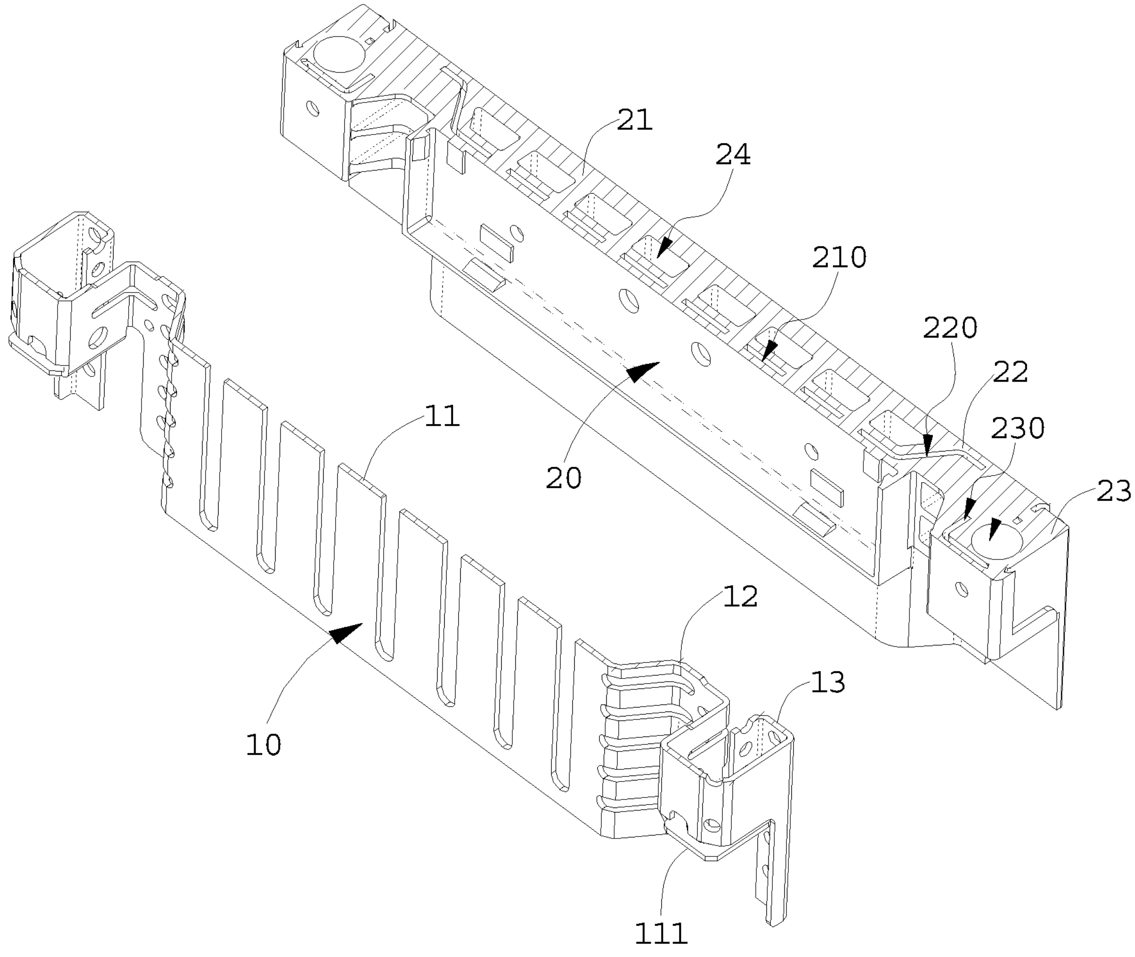
FIG. 5 is an exploded view of the battery module end plate shown in FIG. 4.

Referring to FIG. 3 and FIG. 4, the second plate body 20 has at least one weight reduction hole 24. The at least one weight reduction hole 24 is an elongated hole extending in a longitudinal direction of the second plate body 20. The at least one weight reduction hole 24 includes a plurality of weight reduction holes 24 arranged at intervals in parallel in a transverse direction of the plurality of weight reduction holes 24.

The second body plate 20 includes a second body portion 21, two second profiled portions 22, and two second fixing portions 23. The second body portion 21 has a first accommodation space 210 for accommodating the first body portion 11. The weight reduction hole 24 is formed at the second body portion 21. The two second profiled portions 22 are respectively arranged at two ends of the second body portion 21, and each of the two second profiled portions 22 internally has a second accommodation space 220 for accommodating the first profiled portion 12. It can be understood that the two first profiled portions 12 are respectively accommodated in the respective second accommodation spaces 220 of the two second profiled portions 22. The two second fixing portions 23 are respectively arranged at ends of the two second profiled portions 22 away from the second body portion 21. Each of the second fixing portions 23 internally has a third accommodation space 230 for accommodating the first fixing portion 13. It can be understood that the two first fixing portions 13 are respectively accommodated in the respective third accommodation spaces 230 of the two first fixing portions 13. Further, the connection surfaces 110 and the locking surfaces 111 are exposed from the second fixing portions 23. Furthermore, a locking hole 231 is formed at each of the two second fixing portions 23. The locking hole 231 penetrates a top and a bottom of the second fixing portion 23. The locking surface 111 has an avoidance hole 112 corresponding to the locking hole 231.

In some embodiments, after the operation at block S40, the preparation method further includes operations at blocks S50 to S100.

At block S50, the battery module end plate 100 is rinsed. After removing the battery module end plate 100 from the mold cavity of the molding die, impurities may generally adhered to a surface of the battery module end plate 100. Therefore, the impurities on the surface of the battery module end plate 100 can removed by rinsing.

At block S60, the battery module end plate 100 is polished. In an example, when both the first plate body 10 and the second plate body 20 are made of metal, a surface of the second plate body 20 and a part of the first plate body 10 exposed from the second plate body 20 are polished. When the first plate body 10 is made of metal and the second plate body 20 is made of plastic, only the part of the first plate body 10 exposed from the second plate body 20 is polished.

At block S70, the battery module end plate 100 is deburred.

At block S80, CNC process is performed on the battery module end plate 100. In an example, the battery module end plate 100 may be micro-machined through the CNC process. For example, slotted holes are machined at the battery module end plate 100.

At block S90, the battery module is cleaned. After the CNC process, there are some debris on the battery module end plate 100, and the debris on the battery module end plate 100 can be removed by cleaning the battery module end plate 100.

At block S100, the battery module is powder sprayed.

The present disclosure further provides a battery module end plate 100 prepared by the preparation method as described above. In an exemplary embodiment, the battery module end plate 100 includes a first plate body 10 and a second plate body 20 wrapped around the first plate body 10. As shown in FIG. 4, the first blank is made of metal such as aluminum or steel, etc. The second blank may be made of metal or plastic, and the metal may be aluminum. It should be noted that when the first blank is made of steel, the second blank is made of aluminum. When the first blank is made of steel, the second blank is made of aluminum.

Referring to FIG. 2, in some embodiments, each of two ends of the first plate body 10 has a connection surface 110, and the connection surface 110 is an end face of the first plate body 10. The connection surface 110 is a smooth surface. The connection surfaces 110 are exposed from the second plate body 20. Therefore, the connection surfaces 110 can be welded to the side plate when the battery module end plate 100 is assembled with the side plate. Since the first plate body 10 is embedded in the second plate body 20 and the first plate body 10 is metal, the stiffness of the connection surface 110 can be effectively ensured. In this way, as the connection surfaces 110 of the first plate body 10 are welded to the side plate, the connection stability between the battery module end plate 100 and the side plate can be effectively ensured, which in turn ensures the overall stiffness of the battery module.

In some embodiments, the first plate body 10 further has a locking surface 111, and the locking surface 111 is adjacent to the connection surface 110. The locking surface 111 is exposed from the second plate body 20, and is configured to be connected to an external component. Since the first plate body 10 is embedded in the second plate body 20 and the first plate body 10 is made of metal, stiffness of the locking surface 111 can be effectively ensured.

Referring from FIG. 2 to FIG. 5, in an exemplary embodiment, the first plate body 10 includes a first body portion 11, two first profiled portions 12, and two first fixing portions 13. The first body portion 11 is in a flat plate shape, and each of the two first profiled portions 12 is in an L shape. The two first profiled portions 12 are respectively arranged at two ends of the first body portion 11, and the two first fixing portions 13 are respectively arranged at ends of the two first profiled portions 12 away from the first body portion 11. Each of the first fixing portions 13 is a hollow. A side of each of the first fixing portions 13 facing away from the first profiled portion 12 is the connection surface 110, and each of a top surface and a bottom surface of the first fixing portion 13 are the locking surface 111.

In some embodiments, the first plate body 10 has at least one opening 14. The second plate body 20 is partially located in the at least one opening 14. By forming the at least one opening 14 at the first plate body 10, the second plate body 20 is allowed to be partially located in the at least one opening 14, thereby effectively increasing the bonding force between the first plate body 10 and the second plate body 20, which in turn ensures anti-deformation strength of the battery module end plate 100 in a cycle process of high expansion force. Further, the at least one opening 14 includes a plurality of openings 14. The plurality of openings 14 includes some transverse elongated holes, some longitudinal elongated holes, and some circular holes. By providing the plurality of openings 14 with different shapes, it is beneficial to further increase the bonding force between the first plate body 10 and the second plate body 20. In an example, the plurality of openings 14 at the first body portion 11 are longitudinal elongated holes, and are arranged at parallel intervals in a lateral direction of the first plate body 10. The plurality of openings 14 at the first profiled portions 22 is transversely elongated holes, and is arranged at intervals in parallel in a longitudinal direction of the first plate body 10. Some of the plurality of openings 14 at the first fixing portions 13 is transverse elongated holes, and some of the plurality of openings 14 at the first fixing portions 13 are circular holes.

Referring to FIG. 3 and FIG. 4, the second plate body 20 has at least one weight reduction hole 24. The at least one weight reduction hole 24 is an elongated hole extending in a the longitudinal direction of the second plate body 20. The at least one weight reduction hole 24 includes a plurality of weight reduction holes 24 arranged at intervals in parallel in a transverse direction of the plurality of weight reduction holes 24.

The second body plate 20 includes a second body portion 21, two second profiled portions 22, and two second fixing portions 23. The second body portion 21 has a first accommodation space 210 for accommodating the first body portion 11. The two second profiled portions 22 are respectively arranged at two ends of the second body portion 21, and each of the two second profiled portions 22 internally has a second accommodation space 220 for accommodating the first profiled portion 12. It can be understood that the two first profiled portions 12 are respectively accommodated in the respective second accommodation spaces 220 of the two second profiled portions 22. The two second fixing portions 23 are respectively arranged at ends of the two second profiled portions 22 away from the second body portion 21. Each of the second fixing portion 23 internally has a third accommodation space 230 for accommodating the first fixing portion 13. It can be understood that the two first fixing portions 13 are respectively accommodated in the third accommodation spaces 230 of the two first fixing portions 13. Further, the connection surfaces 110 and the locking surfaces 111 are exposed from the second fixing portions 23. Further, a locking hole 231 is formed at each of the second fixing portions 23. The locking hole 231 penetrates a top and a bottom of the second fixing portion 23. The locking surface 111 has an avoidance hole 112 corresponding to the locking hole 231.

In the battery module end plate 100 prepared by the preparation method according to the above embodiments of the present disclosure, the second plate body 20 is wrapped around the first plate body 10. As a result, the first plate body 10 and the second plate body 20 are formed integrally. Therefore, an overall structural stability of the battery module end plate can be effectively ensured, which is conducive to improving an overall anti-deformation capability of the battery module end plate and to reducing a deformation degree of the battery module end plate under a high expansion force. Therefore, it is possible to ensure the overall structural stability of the battery module, which in turn effectively ensures that the battery module can be used normally. In addition, in the preparation method, the first plate body 10 is first stamped and molded, and then the first plate body 10 is placed into the molding die. Then, the melted second blank is injected into the molding die and the battery module end plate 100 is obtained through cooling. Therefore, the process is simple, the production efficiency is high, and the cost is low. Moreover, the battery module end plate 100 is molded through the molding die, and thus has good consistency, which can effectively ensure the accuracy of the battery module end plate 100. Therefore, it is possible to effectively ensure the dimension accuracy of the connection surfaces 110 and the locking surfaces 111 of the battery module end plate 100.

According to embodiments of the present disclosure, a battery module is further provided. The battery module includes the battery module end plate 100 as described above. In an exemplary embodiment, two battery module end plates 100 are provided. The battery module further includes a bottom plate, a cover, two side plates, and a plurality of battery cells. The plurality of battery cells is sequentially connected in series to form a battery pack. The bottom plate is located at a bottom of the battery pack, and the cover is located at a top of the battery pack. The two side plates are located at two sides of the battery pack, respectively. The two battery module end plates 100 are located at two ends of the battery pack. The connection surface 110 of the battery module end plate 100 is welded to an end surface of the side plate.

In order to make the description simple, all possible combinations of the technical features in the foregoing embodiments are not described. However, as long as there is no conflict between the technical features in the embodiments, any combination of technical features in the above-described embodiments may be adopted, which should be considered to be fallen within the scope of the present disclosure.

The above embodiments illustrate merely some implementations of the present disclosure, which are described in details but are not construed to limit the scope of the present disclosure. It should be noted for those of ordinary skill in the art that various changes and improvements may be made without departing from the principle of the present disclosure, which are all fallen within the scope of the present disclosure. Therefore, the scope of the present disclosure shall be defined by the appended claims.

What is claimed is:

1. A preparation method for a battery module end plate, the preparation method comprising:

providing a first blank and stamping the first blank to obtain a first plate body;

providing a molding die and placing the first plate body into the molding die;

providing a second blank and melting the second blank to obtain a molten material; and injecting the molten material into the molding die to allow the molten material to be wrapped around the first plate body, and obtaining the battery module end plate through cooling, wherein the battery module end plate comprises the first plate body and a second plate body, the second plate body being formed by cooling the molten material and wrapped around the first plate body, each of two ends of the first plate body has a connection surface exposed from the second plate body, the first plate body has a locking surface exposed from the second plate body adjacent to the connection surface and configured to be connected to an external component, the first plate body has at least one opening, the at least one opening being filled with a part of the molten material during an injection of the molten material into the molding die, the at least one opening comprises a plurality of openings, including some transverse elongated holes, some longitudinal elongated holes, and some circular holes, the longitudinal elongated holes are arranged at intervals in parallel in a transverse direction of the first plate body.

2. The preparation method according to claim 1, wherein:

the first blank is made of metal;

the second blank is made of metal.

3. The preparation method according to claim 2, wherein when both the first blank and the second blank are made of metal, the battery module end plate is molded through die-casting molding after the molten material is injected into the molding die.

4. The preparation method according to claim 1, wherein the first plate body comprises a first body portion, two first profiled portions, and two first fixing portions, the first body portion is in a flat plate shape, and each of the two first profiled portions is of an L shape, the two first profiled portions are respectively arranged at two ends of the first body portion, and the two first fixing portions are respectively arranged at ends of the two first profiled portions away from the first body portion, each of the first fixing portion is a hollow.

5. The preparation method according to claim 4, wherein a side of each of the first fixing portions facing away from the respective first profiled portion is the connection surface, and each of a top surface and a bottom surface of the first fixing portion is the locking surface.

6. The preparation method according to claim 4, wherein the second body plate comprises a second body portion, two second profiled portions, and two second fixing portions, the second body portion has a first accommodation space for accommodating the first body portion, the two second profiled portions are respectively arranged at two ends of the second body portion, and each of the two second profiled portions internally has a second accommodation space for accommodating one of the two first profiled portions, the two second fixing portions are respectively arranged at ends of the two second profiled portions away from the second body portion, each of the second fixing portions internally has a third accommodation space for accommodating one of the two first fixing portions.

7. The preparation method according to claim 6, wherein the connection surfaces and the locking surfaces are exposed from the second fixing portions, a locking hole is formed at each of the two second fixing portions, the locking hole penetrates a top and a bottom of each of the corresponding second fixing portion.

8. The preparation method according to claim 7, wherein the locking surface has an avoidance hole corresponding to the locking hole.

9. The preparation method according to claim 1, wherein the second plate body has at least one weight reduction hole, the at least one weight reduction hole is an elongated hole extending in a longitudinal direction of the second plate body.

10. The preparation method according to claim 1, wherein the second plate body has a plurality of weight reduction holes each extending in a longitudinal direction of the second plate body and arranged at intervals in parallel in a transverse direction of the plurality of the second plate body.

11. The preparation method according to claim 1, wherein the transversely elongated holes are arranged at parallel intervals in a longitudinal direction of the first plate body.

12. A preparation method for a battery module end plate, the preparation method comprising:

providing a first blank and stamping the first blank to obtain a first plate body;

providing a molding die and placing the first plate body into the molding die;

providing a second blank and melting the second blank to obtain a molten material; and injecting the molten material into the molding die to allow the molten material to be wrapped around the first plate body, and obtaining the battery module end plate through cooling, wherein the battery module end plate comprises the first plate body and a second plate body, the second plate body being formed by cooling the molten material and wrapped around the first plate body, each of two ends of the first plate body has a connection surface exposed from the second plate body, the first plate body has a locking surface exposed from the second plate body adjacent to the connection surface and configured to be connected to an external component;

rinsing the battery module end plate to remove impurities on a surface of the battery module end plate;

polishing a surface of the first plate body and the second plate body of the battery module end plate and a part of the first plate body exposed from the second plate body; and deburring the battery module end plate.

* * * * *